Feb. 21, 1967  H. D. BAUMANN  3,304,949

VALVE

Filed March 22, 1965

HANS D. BAUMANN
INVENTOR.

BY 3,304,949
VALVE
Hans D. Baumann, Decatur, Ill., assignor to Riley Stoker Corporation, Worcester, Mass., a corporation of Massachusetts
Filed Mar. 22, 1965, Ser. No. 441,649
5 Claims. (Cl. 137—270)

This invention relates to a valve and, more particularly, to apparatus arranged to control the flow of liquid or the like in a fluid system.

In the construction of fluid systems or in the revision of previously-installed systems, it is sometimes necessary or desirable to be able to change the manner of operation of a valve without changing the valve itself. It may be desirable to change the valve from a condition in which it operates to open upon receiving a signal to a condition in which it operates to close upon the receipt of a signal. In other words, the operations of the valve may be either "normally-open" or "normally-closed." Often it is desirable to change a valve of this type without removing it from the line. Attempts to produce such valves in the past have been less than successful; they have been, on the whole, very expensive because of their complexity, have been easily worn out, and have been subject to a considerable need for maintenance. Furthermore, in most valves it is necessary to remove the valve from the line in order to refinish the plug and seat surfaces. These and other difficulties experienced with the prior art devices have been obviated in a novel manner by the present invention.

It is, therefore, an outstanding object of the invention to provide a valve whose mode of operation can be readily changed from normally-open to normally-closed.

Another object of this invention is the provision of a valve whose plug and seats are removable from the valve body to permit them to be refinished by lapping without removing the valve from the line.

A further object of the present invention is the provision of a valve having a removable and reversible valve seat which is held firmly in place during normal operation of the valve.

It is another object of the instant invention to provide a valve which is simple and rugged in construction and which is capable of a long life of useful service with a minimum of maintenance.

With these and other objects in view, as will be apparent to those skilled in the art, the invention resides in the combination of parts set forth in the specification and covered by the claims appended hereto.

The character of the invention, however, may be best understood by reference to one of its structural forms as illustrated by the accompany drawings in which.

Figure 1:
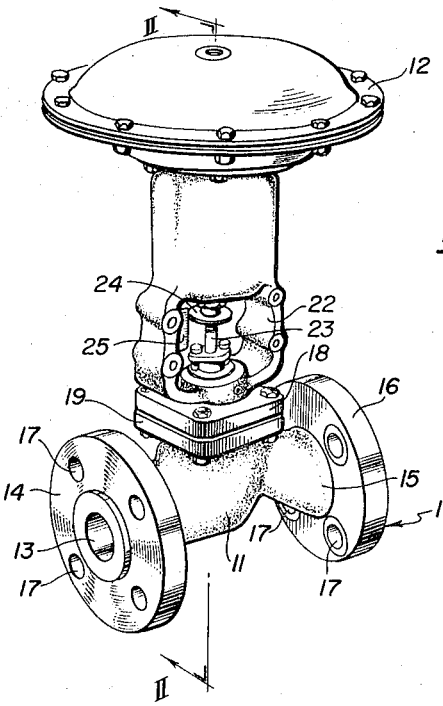
FIG. 1 is a perspective view of a valve embodying the principles of the present invention.

Referring first to FIG. 1, wherein are best shown the general features of the invention, it can be seen that the valve, indicated generally by the reference numeral 10, is provided with a housing 11 on which is mounted a pneumatic actuator 12. The housing is provided with an inlet port 13 around which is mounted a removable flange 14 and with an outlet port 15 around which is mounted a removable flange 16. These flanges are provided with bolt holes 17 to permit the valve to be mounted in a fluid system.

Mounted on the upper portion of the housing 11 is a bonnet 18 fastened by means of bolts 21 to a flange 19 forming part of the housing 11. Mounted on top of the bonnet 18 is a supporting frame 22 on top of which is mounted the actuator 12. Extending from the housing and through the bonnet 18 is a valve stem 23 which carries an indicator collar 24 whose outer periphery extends close to a scale 25 which is mounted on the frame 22 to show valve position.

Figure 2:
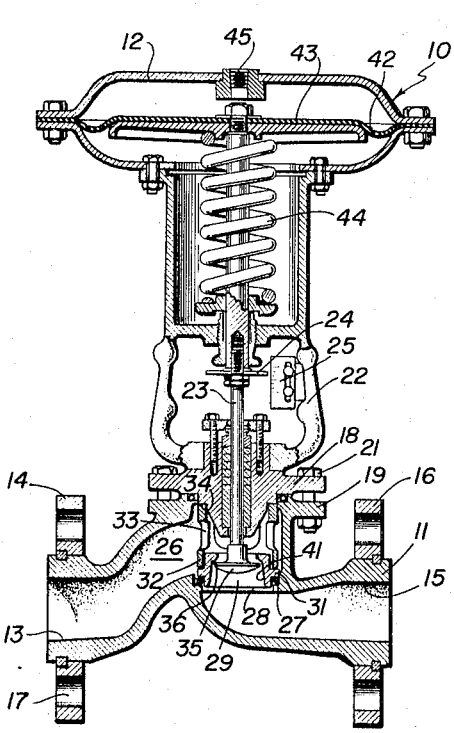
FIG. 2 is a sectional view of the valve taken on the line II—II of FIG. 1.

Referring now to FIG. 2, it can be seen that the inlet port 13 and the outlet port 15 extend inwardly to a valve chamber 26 across which extends a horizontal wall 27 through which extends a circular aperture 28. In the aperture rests a seat member 29 which is generally cup-shaped and is provided with a radial flange 31 which rests on the wall 27 and supports the seat member so that it extends into the aperture 28. In the chamber 26 is provided a tubular retainer 32 which is provided with large apertures 33 intermediate of its ends. One end of the retainer 32 presses against the flange 31 of the seat member 29 and the other end engages a radial surface 34 on the underside of the bonnet 18. The lower end of the valve stem 23 is provided with a plug member 35 which engages a seat 36 formed on the seat member 29. The seat surrounds a bore 37 which extends through the bottom of the seat member 29. The valve stem 23 extends through the bore 37.

Figure 3:
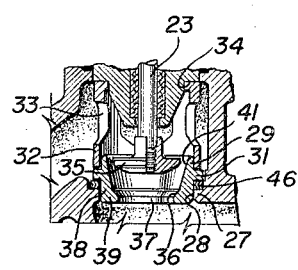
FIG. 3 is an enlarged view of a portion of the valve.

In FIG. 3, it can be seen that the seat member 29 has been reversed in the aperture 28. The seat member consists of a tubular portion 38 terminating in a bottom 39 through which extends the bore 37. The bore 37 meets the seat 36 and the seat 36 blends with a mathematically-formed inner surface 41 of the tubular portion 38 of the seat member. This inner surface is carefully formed to provide the desired valve characteristics in combination with the plug member 35. The plug member 35 is relatively flat and is provided with a bevel to mate with the conical seat 36. A seal 46 underlies the flange 31 and lies between it and the wall 27.

It can be seen in FIG. 2 that the valve stem 23 extends upwardly into the actuator 12 and is connected to a diaphragm 42 and to a diaphragm plate 43. Surrounding the stem and underlying the diaphragm is a coil spring 44 which is normally under compression. Entering the housing of the actuator in the upper portion above the diaphragm 42 is a pressure opening 45 suitably connected in the usual way to a pneumatic control system.

The operation of the apparatus will now be readily understood in view of the above description. The valve is shown in closed position in FIG. 2. In order to place it in open condition, it is necessary that pressure air be introduced at the pressure opening 45 of the actuator 12. When this is done, the diaphragm 42 and the plate 43 operate against the spring 44 on the valve stem 23 to move the plug member 35 downwardly. At that time, fluid may enter the inlet port 13, pass into the chamber 26, pass through the openings 33 in the retainer 32, and then pass downwardly through the bore 37 and through the annular space between the outer periphery of the plug member 35 and the mathematically-formed inner surface 41 of the seat member 29. Fluid then flows outwardly through the outlet port 15. By suitably selecting the shape of the inner surface 41 it is possible to give the desired characteristics of the valve in opening and closing. In its open position, the valve characteristics, so far as pressure drop and the like are concerned, are determined by the shape of this surface. When it is desirable to change the operation of the valve so that pressure air causes the valve to close and the normal position is open (as shown in FIG. 3), it is only necessary to reverse the seat member 29. At that time, the flange 31 still rests on the seal 46. This seal, in turn, rests on the wall 27 which extends across the chamber 26 formed in the housing. At that time, of course, the cup-shaped seat member 29 faces upwardly instead of downwardly and the plug member 35 resides well above the seat 36. The valve is, therefore, in "open" condition. When pressure air is introduced in the pressure opening 46 the valve stem 23 is moved downwardly, bringing the plug member 35 into contact with the seat 36 and closing the valve.

If it is desired to re-machine the plug member 35 and the seat member 29, it is only necessary to remove the bolts 21 and the support 22 with the actuator 12 from the bonnet 18. The bonnet 18 is removed and the retainer member 32 then removed from the housing. The seat 29 can then be picked up and removed for lapping and refinishing. Thus, the refinishing or replacement of the plug and seat can be accomplished without removing the valve from the line. Because the control characteristic contour of the valve is machined on the seat member rather than on the plug member, full control and uninterrupted characteristic is maintained up to 100% lift. Also, the undesirable tendencies of the conventional type of plugs to cause fluid separation and excessive pressure recovery have been eliminated by making the plug in a disc shape. The resulting decrease in exposed stem and plug length reduces the chance of vibration and, therefore, wear. Since the seat member incorporates the control characteristic that has been provided on the plug member in previously designed valves, it is possible to reduce the amount of lift necessary to obtain full flow by about half that of other single seated valves. This means that the exposed and unguided stem length is reduced and the stem-plug stiffness is increased considerably, thereby reducing possible wear caused by fluid vibration. The seat and plug design (which is self-aligning) permits a disregard of a minimum clearance normally required and gives a wider range of possible operation.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:
1. A valve, comprising
  (a) a housing having a chamber and having an inlet opening and an outlet opening into the chamber, the housing having a wall extending across the chamber, which wall is provided with an aperture,
  (b) a seat member of generally cup-shaped configuration having a tubular side wall, the exterior of the side wall having a flange extending radially outwardly therefrom, a second flange extending inwardly from one end of the said tubular side wall to define a bore which is coaxial of the side wall, the seat member residing in the aperture in the said wall with the flange supported on the wall around the aperture, the seat member being reversible in the said aperture,
  (c) a plug member residing in the seat member and contacting the second flange of the seat member around the bore, the inner surface of the said tubular side wall being geometrically formed to give accurate control of the space between the plug and the surface when the plug is not contacting the said second flange, and
  (d) a stem extending from the plug member to the exterior of the housing for the control of the relative positions of the plug member and the seat member.

2. A valve as recited in claim 1, wherein a packing ring resides between the flange of the seat member and the wall.

3. A valve as recited in claim 1, wherein a tubular retaining member extends coaxially of the seat member between the flange and the housing, the retaining member having openings in its intermediate portion to permit the flow of fluid to the bore of the seat member.

4. A valve as recited in claim 3, wherein a portion of the housing consists of a removable bonnet through which the stem passes, the bonnet having a radial surface concentric of the stem against which one end of the retaining member presses.

5. A valve as recited in claim 1, wherein a diaphragm-type actuator is mounted on the exterior of the housing and is connected to the stem, the actuator being operable in one direction by the introduction of pressure air and returnable in the other direction by a spring, the reversal of the seat member permitting the pressure air to cause the plug member to close the valve in one condition of the seat member and to open the valve in the other condition.

References Cited by the Examiner

UNITED STATES PATENTS

| 2,697,599 | 12/1954 | Vandal | 137—270 X |
| 2,956,574 | 10/1960 | Cowan | 137—270 X |
| 3,123,091 | 3/1964 | Elsey | 137—270 |
| 3,168,011 | 2/1965 | Baumann | 137—270 X |

FOREIGN PATENTS 706,026 10/1930 France.

M. CARY NELSON, *Primary Examiner.*

R. J. MILLER, *Assistant Examiner.*